United States Patent [19]

Egan et al.

[11] Patent Number: 4,592,145
[45] Date of Patent: Jun. 3, 1986

[54] HACKSAW HAND GUARD

[76] Inventors: Peggy S. Egan; Daniel J. Egan, both of P.O. Box 1341, Dewey, Ariz. 86327

[21] Appl. No.: 679,365

[22] Filed: Dec. 7, 1984

[51] Int. Cl.[4] .............................................. B27B 21/02
[52] U.S. Cl. ........................................ 30/507; 30/295; 30/513
[58] Field of Search ................. 30/166 R, 166 A, 286, 30/295, 390, 392, 507, 510, 511, 512, 513

[56] References Cited

U.S. PATENT DOCUMENTS

| 151,295 | 5/1874 | Knight. | |
|---|---|---|---|
| 573,215 | 12/1896 | Gleim | 30/295 |
| 840,832 | 1/1907 | Everett | 30/295 |
| 1,517,827 | 12/1924 | De Grado | 30/513 |
| 2,014,722 | 9/1935 | Damon | 30/510 |
| 3,327,748 | 6/1967 | Reuterfors | 30/513 |
| 4,079,763 | 3/1978 | Riley | 30/513 X |
| 4,089,379 | 5/1978 | Crownover | 172/370 |
| 4,256,156 | 3/1981 | Biszantz | 30/507 |

FOREIGN PATENT DOCUMENTS

| 344962 | 11/1904 | France | 30/295 |
|---|---|---|---|
| 534431 | 1/1922 | France | 30/295 |

Primary Examiner—Jimmy C. Peters
Attorney, Agent, or Firm—Cahill, Sutton & Thomas

[57] ABSTRACT

A hand guard for a hacksaw has main portions extending outwardly and rearwardly from a rear post of the hacksaw frame and top and bottom portions smoothly connecting upper and lower regions of the main portions with upper and lower regions of the rear post. The guard forms a cup-like receptacle for the fingers and knuckles of the hand of the user to protect them from contact with foreign objects. The top portions of the guard have depressions therein for receiving the thumb of the user in a comfortable extended position.

6 Claims, 3 Drawing Figures

HACKSAW HAND GUARD

TECHNICAL FIELD

This invention is concerned with providing protection for the hand of the user of a hacksaw.

BACKGROUND ART

The hand by which a user holds and manipulates a hacksaw is particularly vulnerable to injury. The cutting stroke for such a saw is performed by pushing forward on the saw and because the saw is used to cut tough material, such as metal, considerable force must be exerted on the saw. The user's hand is wrapped around a pistol grip-like handle at the rear of the saw frame exposing the fingers and knuckles of the hand on opposite sides of the handle. If the saw is mishandled the fingers and knuckles easily can come into contact with the work piece. Moreover, such saws are often employed to cut objects which are in close proximity to other objects, or structural members, with which the hand of the user can easily come into contact. Forceful use of this saw thus can result in badly "skinned" fingers and knuckles.

Of course, it has been customary for many years to provide weapons, such as swords and foils, with hand guards to protect the hand of the user from a weapon in the hands of an opponent. See, for example, U.S. Pat. No. 840,832, granted Jan. 8, 1907 to H. F. Everett for "Handled Implement".

It has also been proposed that other hand tools, or implements, be designed with hand protecting features. A leather or rubber guard or shield attached to a box and bale hook to protect the user's hand from sharp protruberances is disclosed in U.S. Pat. No. 151,295, granted May 26, 1874 to J. W. Knight for "Improvement in Box and Bale Hooks". U.S. Pat. No. 4,089,379, granted May 16, 1978 to F. S. Crownover for "Glove and Tool Device" suggests that the handle of a garden tool be surrounded by a glove-like enclosure to protect the hand of the user.

None of these prior art guards are particularly suited for use on a hacksaw.

DISCLOSURE OF INVENTION

The guard of this invention is adapted to be affixed to or intergral with the rear post portion of a hacksaw frame. This rear post is attached to and supports the rear end of a saw blade and is positioned directly in front of the pistol grip handle of the saw. The guard preferably extends outwardly from both sides of the rear post although a guard extending to one side only of the post could be utilized, but would not be as effective in preventing injury.

The guard preferably has a middle, or main, portion which extends with a smooth curvature outwardly and rearwardly from the rear post and has top and bottom portions which connect the upper and lower regions of the middle portion to components of the saw rearwardly of the rear post. With this construction the guard provides a cup-like receptor area just forward of the saw handle to receive the knuckles and fingers of the user so that the guard partially surrounds and protects these sensitive members on the user's hand.

The guard of this invention also preferably has depressions formed in the top portions thereof alongside the saw frame to receive the thumb of the user in a comfortable, extended position. These depressions are sufficiently deep to completely receive the thumb so that adjoining portions of the guard can shield the thumb against contact with foreign objects.

BRIEF DESCRIPTION OF THE DRAWINGS

In the following detailed description of the invention reference is made to the accompanying drawing wherein.

BEST MODE FOR CARRYING OUT THE INVENTION

Figure 1:
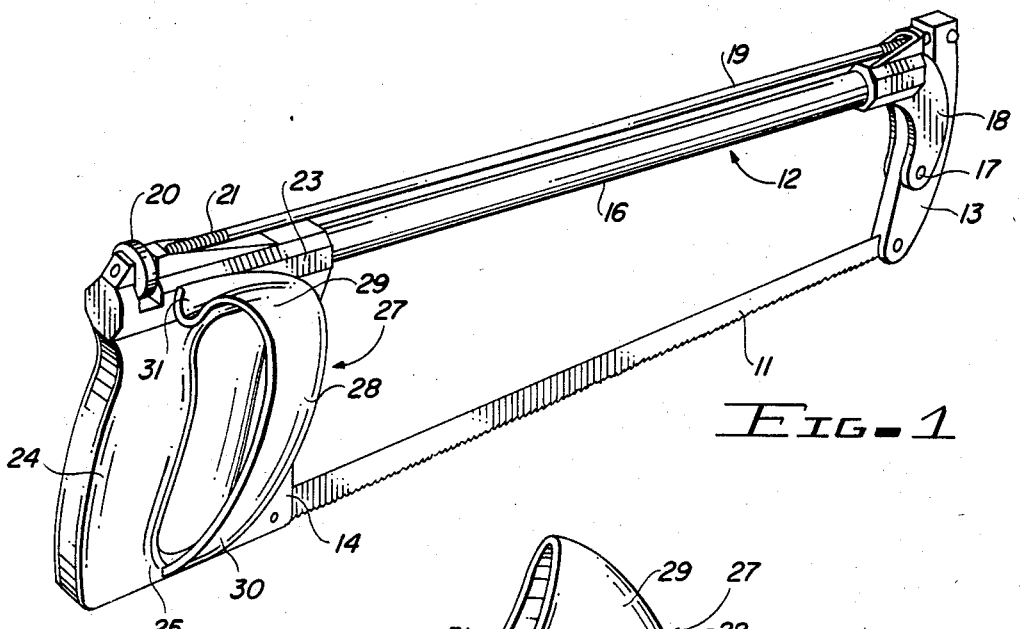
FIG. 1 is a perspective view of a hacksaw equipped with the guard of this invention.
Figure 2:
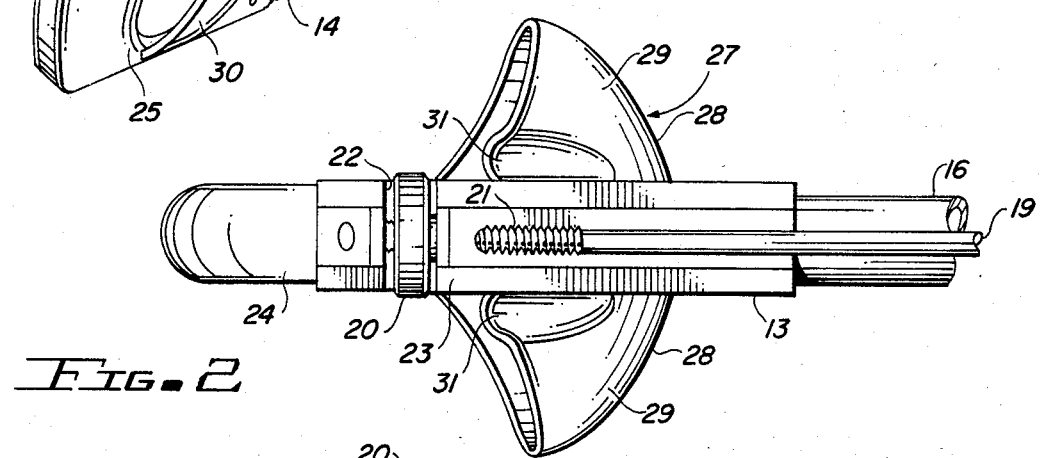
FIG. 2 is a plan view of the handle portion of the hacksaw of FIG. 1.
Figure 3:
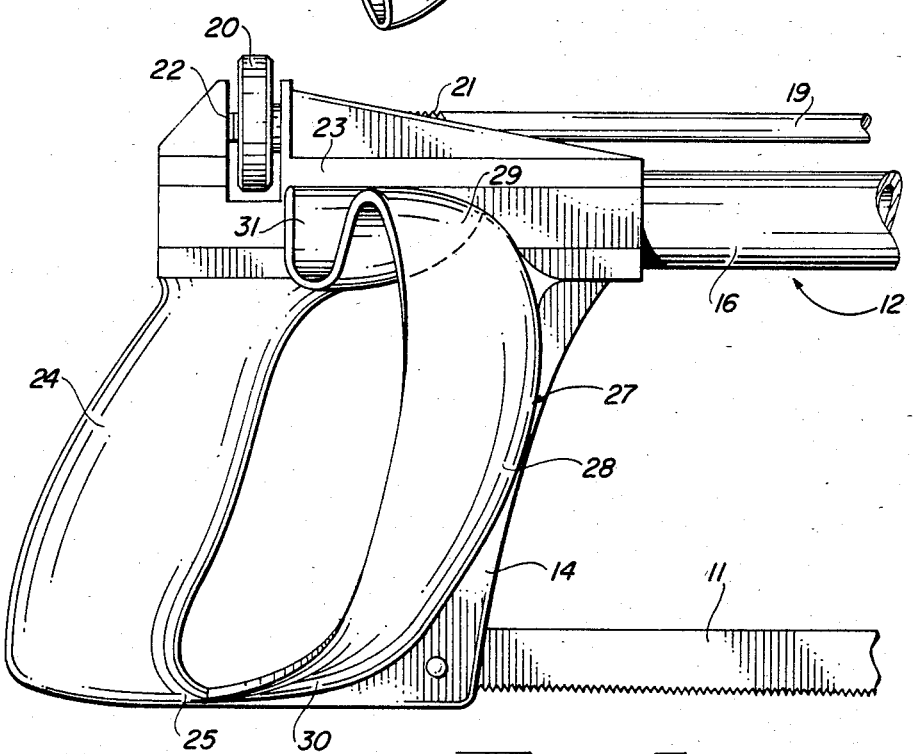
FIG. 3 is an elevational view of the handle portion of the saw.

The hacksaw illustrated in the drawing and equipped with the guard of this invention is of more or less standard construction. A thin, fine-toothed metal blade 11 is mounted in tension in a frame 12 which includes forward and rear support posts, 13 and 14 respectively, mounted on the ends of a tubular spine 16. Forward post 13 is pivotally attached at 17 to a mounting arm 18 carried on the forward end of spine 16. The upper end of front post 13 is drawn rearwardly by a tension rod 19 having a thumb nut 20 mounted on the threaded rear end 21 of the tension rod 19 and carried in a slot 22 in a barrel-like extension 23 of rear post 14. Turning nut 20 in slot 22 has the effect of placing rod 19 under tension and this tension is transmitted through forward post 13 to blade 11 to hold it in tension as well.

The conventional components of the hacksaw are completed by a pistol grip-like handle 24 which is secured at its upper end to extension 23 of rear post 14 and may also have its lower end attached to a lower portion of rear post 14 by means of a web 25. Handle 24 is usually shaped to provide a comfortable and secure grip in the hand of the user of the hacksaw.

To protect the exposed fingers and knuckles of the user the hacksaw of this invention is equipped with a guard, or shield, indicated generally by reference numerial 27. Guard 27 preferably has a middle, or main, portion 28 extending in smoothly curved fashion outwardly and rearwardly from rear post 14 on both sides of the post. Each middle portion 28 of the guard 27 has associated therewith top and bottom portions, indicated generally at 29 and 30, respectively, which blend smoothly into the middle portion of the guard. The top, bottom and middle portions of the guard 27 cooperate to form a recess for receiving the fingers and knuckles of the hand gripping the handle 24.

It is preferred that each top portion 29 of the guard have a thumb-receiving depression 31 formed therein alongside extension 23. When gripping a pistol-like object it is often more comfortable for the user to place the thumb in a generally horizontal forward extension above the fingers, rather than wrapping the thumb around the fingers. With depressions 31 in guard 27 it is possible for the thumb of the user to be positioned in this manner with the thumb in the depression. Each depression 31 is deep enough to receive a normal human thumb in its entirety so that the thumb is not exposed above the adjoining surface of the top 29 of the guard, but is protected from contact with foreign objects.

Guard 27 is preferably formed from the same material used to form the rear post 14 and the handle 24 of the hacksaw. Thus, all of these components can be molded intergrally of a material such as high impact plastic material, or they can be die cast from a light metal, such as aluminum. Alternatively, the guard 27 can be formed of two separate clam shell-like pieces which are then bolted, riveted, or otherwise affixed to the rear post 14 of the hacksaw.

From the foregoing it should be apparent that this invention provides a guard uniquely capable of preventing injury to the knuckles and fingers of a hacksaw user.

What is claimed is:

1. The combination with a hacksaw comprising a frame having forward and rear posts, a saw blade tensioned between said posts, and a pistol grip-like handle disposed rearwardly of said rear post and having its upper end connected to an upper region of said rear post, of a hand guard adapted to be secured to said rear post for preventing the user's hand from contacting a workpiece, said guard having its main portions extending outwardly and rearwardly from said rear post, but terminating ahead of said handle to facilitate gripping the handle.

2. The combination of claim 1 wherein said guard has main portions which extend outwardly and rearwardly from both sides of said rear post.

3. The combination of claim 1 wherein said guard has top and bottom portions extending outwardly from said rear post and joined to said main portion.

4. The combination of claim 2 wherein said guard has top and bottom portions extending outwardly from both sides of said rear post and joined to said main portions to form a cup-like receptor area for the fingers and knuckles of the user.

5. The combination of claim 3 wherein said top portion of said guard has a depression therein to receive the thumb of the user.

6. The combination of claim 4 wherein said top portions of said guard have depressions therein to receive the thumb of the user.

* * * * *